United States Patent
Pettigrew et al.

(10) Patent No.: US 6,951,278 B2
(45) Date of Patent: Oct. 4, 2005

(54) DISC HOLDING APPARATUS

(75) Inventors: Michael Pettigrew, London (GB); Naomitsu Sakaguchi, London (GB)

(73) Assignee: Nexpak Corporation, Uniontown, OH (US)

( * ) Notice: Subject to any disclaimer, the term of this patent is extended or adjusted under 35 U.S.C. 154(b) by 0 days.

(21) Appl. No.: 10/380,943

(22) PCT Filed: Oct. 3, 2001

(86) PCT No.: PCT/GB01/04406
§ 371 (c)(1),
(2), (4) Date: Jul. 24, 2003

(87) PCT Pub. No.: WO02/29816
PCT Pub. Date: Apr. 11, 2002

(65) Prior Publication Data
US 2004/0031707 A1 Feb. 19, 2004

(30) Foreign Application Priority Data
Oct. 5, 2000 (GB) .............................. 0024496

(51) Int. Cl.⁷ .............................. B65D 85/57
(52) U.S. Cl. ..................... 206/308.1; 206/310; 206/493
(58) Field of Search .................. 206/308.1, 309–313, 206/493, 303, 307

(56) References Cited

U.S. PATENT DOCUMENTS

| | | |
|---|---|---|
| D238,111 S | 12/1975 | Shyers |
| 4,089,414 A | 5/1978 | Sandor et al. |
| 4,120,398 A | 10/1978 | Braddon, Sr. |
| 4,535,888 A | 8/1985 | Nusselder |
| 4,614,269 A | 9/1986 | Dietze et al. |
| 4,702,369 A | 10/1987 | Philosophe |
| 4,750,618 A | 6/1988 | Schubert |
| 4,771,883 A | 9/1988 | Herr et al. |
| 4,793,479 A | 12/1988 | Otsuka et al. |
| 4,819,799 A | 4/1989 | Nomula et al. |
| 4,874,085 A | 10/1989 | Grobecker et al. |
| 4,881,640 A | 11/1989 | Herr et al. |
| 4,895,252 A | 1/1990 | Nomula et al. |
| 4,899,875 A | 2/1990 | Herr et al. |
| 4,903,829 A | 2/1990 | Clemens |
| D318,368 S | 7/1991 | Evans |
| D319,540 S | 9/1991 | Hehn |
| 5,101,971 A | 4/1992 | Grobecker |
| D335,215 S | 5/1993 | Stumpff |
| 5,238,107 A | 8/1993 | Kownacki |
| 5,244,085 A | 9/1993 | Lammerant et al. |
| 5,249,677 A | 10/1993 | Lim |
| 5,251,750 A | 10/1993 | Gelardi et al. |
| 5,299,186 A | 3/1994 | Tsurushima |
| 5,322,162 A | 6/1994 | Melk |
| D351,963 S | 11/1994 | Lim |
| 5,377,825 A | 1/1995 | Sykes et al. |
| 5,383,554 A | 1/1995 | Cowan |
| 5,400,902 A | 3/1995 | Kaminski |
| 5,417,324 A | 5/1995 | Joyce et al. |
| 5,450,953 A | 9/1995 | Reisman |

(Continued)

FOREIGN PATENT DOCUMENTS

| | | |
|---|---|---|
| DE | 3425579 A1 | 1/1986 |
| DE | 3715187 A1 | 11/1988 |

(Continued)

*Primary Examiner*—Jila M. Mohandesi
(74) *Attorney, Agent, or Firm*—Zollinger & Burleson Ltd

(57) ABSTRACT

Apparatus used for holding a disc (12) including a lower surface and an upper surface with an opening extending between the surfaces, comprises a base (1) and a hub (2) extending upwards from the base. The hub includes a center portion (6) adapted to pass through the opening of the disc and engage the upper surface of the disc (12) to hold the disc on the hub. The hub (2) includes outer pieces (4), non-movable with respect to the base (1), for arresting downward movement of the disc (12) during its removal.

19 Claims, 3 Drawing Sheets

U.S. PATENT DOCUMENTS

| | | | |
|---|---|---|---|
| 5,477,960 A | 12/1995 | Chen |
| 5,494,156 A | 2/1996 | Nies |
| 5,515,968 A | 5/1996 | Taniyama |
| 5,526,926 A | 6/1996 | Deja |
| 5,533,614 A | 7/1996 | Walker |
| 5,558,220 A | 9/1996 | Gartz |
| 5,575,388 A | 11/1996 | Bolognia et al. |
| 5,586,651 A | 12/1996 | Krummenacher |
| 5,593,030 A | 1/1997 | Tell |
| D378,333 S | 3/1997 | Anderson |
| 5,609,249 A | 3/1997 | Cheng |
| D379,413 S | 5/1997 | Swanick |
| 5,626,225 A | 5/1997 | Joyce, Jr. |
| 5,651,458 A | 7/1997 | Brosmith et al. |
| 5,660,274 A | 8/1997 | Chien |
| D385,145 S | 10/1997 | VerWeyst et al. |
| 5,685,424 A | 11/1997 | Rozek et al. |
| 5,685,425 A | 11/1997 | Choi |
| 5,685,427 A | 11/1997 | Kuitems et al. |
| 5,713,461 A | 2/1998 | Su |
| 5,727,680 A | 3/1998 | Liu |
| 5,769,217 A | 6/1998 | Derraugh et al. |
| 5,772,021 A | 6/1998 | Bolenbaugh et al. |
| 5,775,491 A | 7/1998 | Taniyama |
| 5,788,068 A | 8/1998 | Fraser et al. |
| 5,799,782 A | 9/1998 | Gelardi |
| 5,799,783 A | 9/1998 | Cheris et al. |
| 5,816,394 A | 10/1998 | O'Brien et al. |
| 5,819,926 A | 10/1998 | O'Brien et al. |
| 5,829,582 A | 11/1998 | Ippolito et al. |
| 5,887,713 A | 3/1999 | Smith et al. |
| D408,202 S | 4/1999 | Jacobson |
| 5,894,924 A | 4/1999 | Koch |
| 5,896,985 A | 4/1999 | Nakasuji |
| 5,896,986 A | 4/1999 | Bolognia et al. |
| 5,906,276 A | 5/1999 | Bolognia et al. |
| 5,944,181 A | 8/1999 | Lau |
| 5,950,822 A | 9/1999 | Cloran et al. |
| 5,960,949 A | 10/1999 | Wynalda, Jr. |
| 5,975,291 A | 11/1999 | Attar et al. |
| 5,988,375 A | 11/1999 | Chang |
| 5,996,788 A | 12/1999 | Belden, Jr. et al. |
| 6,016,909 A | 1/2000 | Chang |
| D421,870 S | 3/2000 | Boucard |
| 6,041,922 A | 3/2000 | Kollinek |
| 6,041,923 A | 3/2000 | Furutsu |
| 6,065,593 A | 5/2000 | Howerton et al. |
| 6,065,594 A | 5/2000 | Sankey et al. |
| D426,721 S | 6/2000 | Benden, Jr. et al. |
| D426,978 S | 6/2000 | Belden, Jr. et al. |
| 6,085,900 A | 7/2000 | Wong |
| 6,092,650 A | 7/2000 | Budnik |
| D430,424 S | 9/2000 | Belden, Jr. et al. |
| 6,116,417 A | 9/2000 | Yoshinaga et al. |
| 6,123,191 A | 9/2000 | Dean |
| 6,123,192 A | 9/2000 | Rufo, Jr. |
| D434,777 S | 12/2000 | Peterson et al. |
| 6,155,417 A | 12/2000 | Flores, Jr. et al. |
| 6,164,446 A | 12/2000 | Law |
| D436,359 S | 1/2001 | Bertrand et al. |
| 6,170,565 B1 | 1/2001 | Nishishita |
| 6,170,656 B1 | 1/2001 | Cerda-Vilaplana et al. |
| 6,179,120 B1 | 1/2001 | Chou |
| D437,171 S | 2/2001 | Cuadrado-Serena |
| D437,520 S | 2/2001 | Choi |
| 6,186,322 B1 | 2/2001 | Dautzenberg |
| D439,435 S | 3/2001 | Belden, Jr. et al. |
| 6,196,384 B1 | 3/2001 | Belden, Jr. |
| 6,206,185 B1 | 3/2001 | Ke et al. |
| 6,206,186 B1 | 3/2001 | Cerda-Vilaplana et al. |
| 6,227,362 B1 | 5/2001 | Cheung |
| 6,227,365 B1 | 5/2001 | Gary |
| 6,237,763 B1 | 5/2001 | Lau |
| 6,241,089 B1 | 6/2001 | Grobecker |
| 6,250,461 B1 | 6/2001 | Hu |
| 6,354,435 B1 | 3/2002 | Belden, Jr. et al. |
| 6,398,022 B1 | 6/2002 | Mou et al. |
| 6,425,481 B1 * | 7/2002 | Choi ...................... 206/308.1 |
| 6,427,833 B1 | 8/2002 | Hui |

FOREIGN PATENT DOCUMENTS

| | | |
|---|---|---|
| DE | 4107218 A1 | 9/1992 |
| DE | 3425579 C2 | 1/1993 |
| DE | 20106714 U1 | 8/2001 |
| EP | 0 356 539 A1 | 3/1990 |
| EP | 0 429 195 A2 | 5/1991 |
| EP | 0 671 048 B1 | 9/1995 |
| EP | 0 896 719 B1 | 2/1999 |
| EP | 1 170 748 A1 | 1/2002 |
| FR | 2 765 999 A1 | 1/1999 |
| GB | 2 187 442 A | 9/1987 |
| GB | 2 243 145 A | 10/1991 |
| GB | 2 291 640 A | 1/1996 |
| GB | 2 312 665 A | 11/1997 |
| JP | 89-14644 | 8/1989 |
| JP | 4-57778 | 2/1992 |
| JP | 92-3285 | 2/1992 |
| JP | 5-51082 | 3/1993 |
| JP | 93-18119 | 8/1993 |
| JP | 93-21558 | 10/1993 |
| JP | 94-1858 | 1/1994 |
| JP | 95-7742 | 9/1995 |
| JP | 95-9718 | 11/1995 |
| JP | 96-10046 | 11/1996 |
| JP | 97-7080 | 2/1997 |
| JP | 97-19497 | 5/1997 |
| WO | WO 93/01598 | 1/1993 |
| WO | WO 94/05010 | 3/1994 |
| WO | WO 96/14636 | 5/1996 |
| WO | WO 97/41563 | 11/1997 |
| WO | PCT/GB95/02581 | 1/1999 |
| WO | WO 01/39193 | 5/2001 |
| WO | WO 02/29816 | 4/2002 |

* cited by examiner

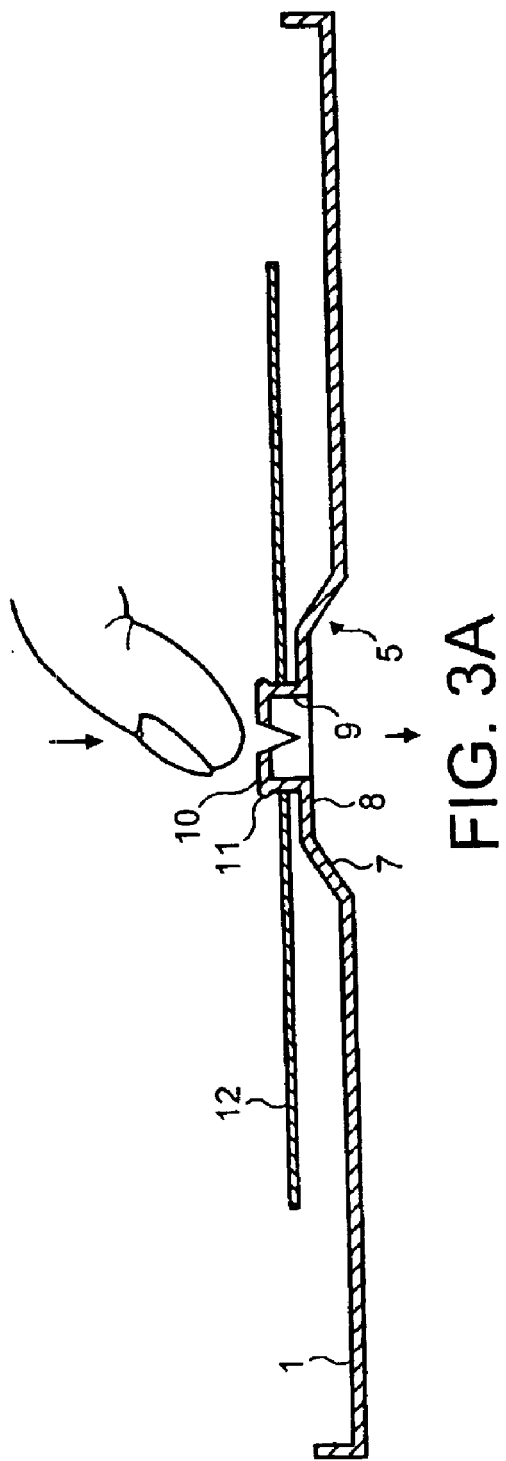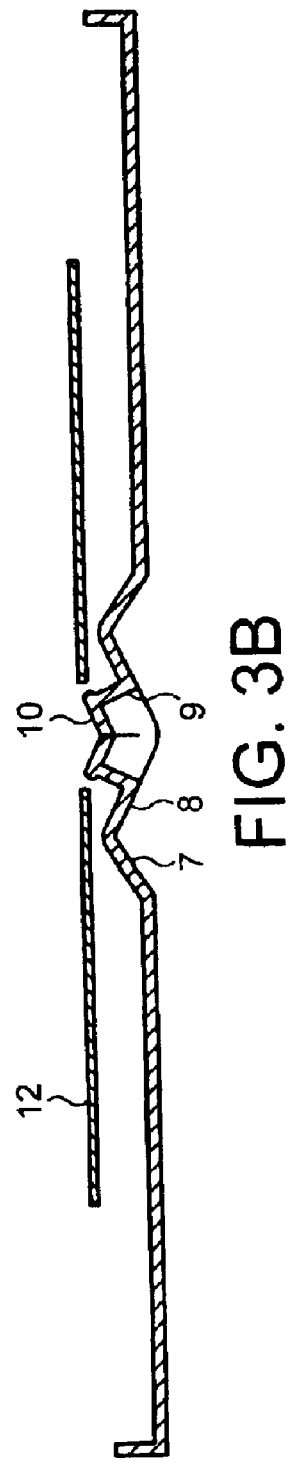

DISC HOLDING APPARATUS

This application is a national phase of International Application No. PCT/GB01/04406 filed Oct. 3, 2001 and published in English on Apr. 11, 2002 under International Publication No. WO 02/29816.

BACKGROUND TO THE INVENTION

This invention relates to a disc holding apparatus used for retaining a disc, in particular a disc on which information is recorded such as an audio compact disc (CD) or CD-ROM, digital versatile disc (DVD) or computer game disc, in a storage case or the like.

Known disc storage cases have a central hub which extends through and engages the hole in the centre of the disc and which is depressed to remove the disc. One disadvantage of conventional hubs is that they generate an unpleasant cracking sound on removing or replacing the disc. A further disadvantage is that repeated usage of the hub can cause visible cracks and scratches on the centre of the disc, affecting the disc's quality and/or performance.

It is known to provide means for causing the disc to be ejected from the hub when the latter is depressed. For example, EP-A-356539 and U.S. Pat. No. 5,251,750 describe outwardly extending cranked ejection arms and WO 96/14636 describes a plurality of inwardly extending resilient cantilevered arms in the base. All of these ejection means are inconvenient to manufacture.

SUMMARY OF THE INVENTION

The present invention seeks to provide a disc holding apparatus in which both noise and cracking/scratching of the disc during removal or replacement of the disc are minimised.

It is also an aim of the invention to provide a disc holding apparatus that is easier to use for consumers, particularly those with co-ordination disabilities.

According to the invention there is provided apparatus for holding a disc including a lower surface and an upper surface with an opening extending between the surfaces, the apparatus comprising a base and a hub extending upwards from the base, the hub including a central portion adapted to pass through the opening of the disc and engage the upper surface of the disc to hold the disc on the hub, characterized in that the hub includes outer pieces, non-movable with respect to the base, for arresting downward movement of the disc during its removal.

Preferably, there are two outer pieces, and these may have substantially parallel inner edges.

The central portion of the hub may comprise a first wall portion extending upwards from the base and a second wall portion extending inwardly from the first wall portion above the base. A pair of disc-engaging arms, preferably spaced from one another and preferably substantially perpendicular to the second wall portion, may extend upwards from the second wall portion. Preferably, the central portion is arranged to be pushed down from a resting position to a depressed position to release the disc from the hub, and each arm has a portion which engages the upper surface of the disc when the central portion is in the resting position and disengages from the upper surface of the disc when the central portion is moved to the depressed position. The central portion preferably functions as a spring to return it from the depressed position to the resting position.

In a preferred embodiment, the arms include upper walls, which cooperate to form a central push button for the hub.

BRIEF DESCRIPTION OF THE DRAWINGS

In order that the invention may be more readily understood, reference will now be made, by way of example only, to the accompanying drawings, in which;

FIG. 3A is a section along the line III—III of FIG. 1, also showing a disc, with the central portion in the resting position; and FIG. 3B is a section similar to FIG. 3 but with the central portion in the depressed position.

Figure 1:
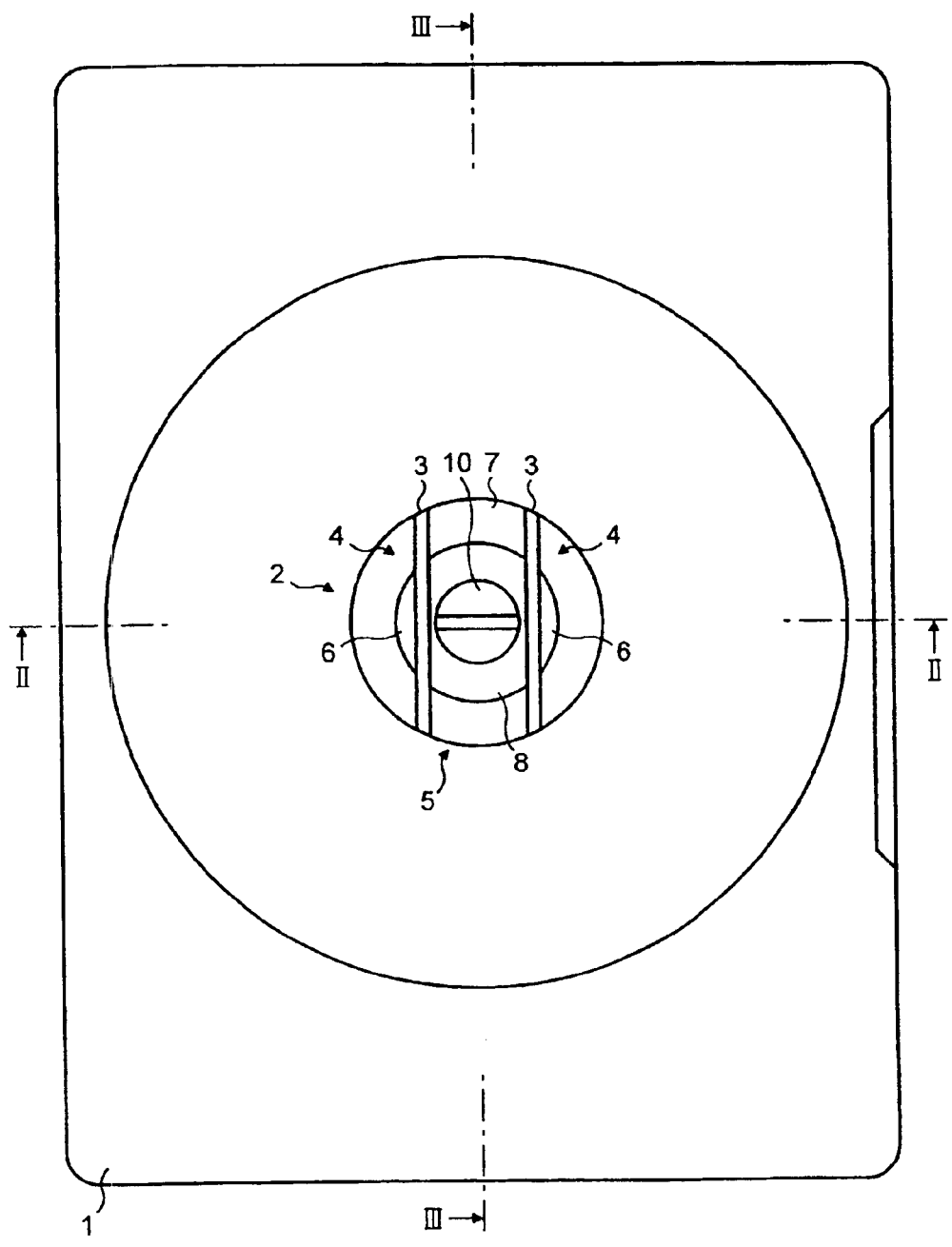
FIG. 1 is a plan of apparatus according to the invention.

The drawings show the portion of a video-style library case for a compact disc or the like adapted to hold the disc. However, it should be understood that the invention also extends to trays provided as inserts in jewel cases, that is clear hinged cases for discs. The case (or alternatively the tray) is preferably injection moulded in one piece from polypropylene or a material with similar characteristics.

The case has a flat base 1, with an upwardly extending substantially circular central hub 2. The hub is divided by two parallel slots 3 into two outer pieces 4 and a central portion 5. The outer pieces 4, formed from segments of the circular hub 2, each have an upwardly sloping outer wall and an abutment surface 6.

The central portion 5 of the hub comprises an upwardly sloping first wall portion 7, and a second wall portion 8 parallel to the base. The wall portions are such that in the absence of the slots 3, in the resting position the upwardly sloping walls of the outer portion would form a continuous frustoconical surface with the first wall portion 7, and the abutment surfaces 6 would form a continuous annular surface with the second wall portion 8.

A pair of substantially semicircular disc-engaging arms 9 extends upwardly from the centre of the second wall portion 8. The arms each have an upper wall 10, parallel to the base, and the upper walls together form a central push button for the hub. The outer edge portions 11 of the upper walls 10 extend outwardly from the arms 9 and are radiused in cross-section.

Figure 2A:
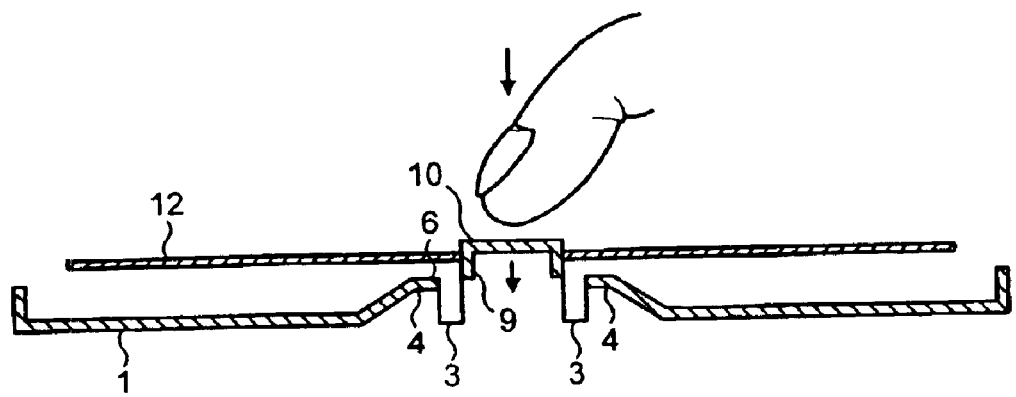
FIG. 2A is a section along the line II—II of FIG. 1, also showing a disc, with the central portion in the resting position.
Figure 2B:
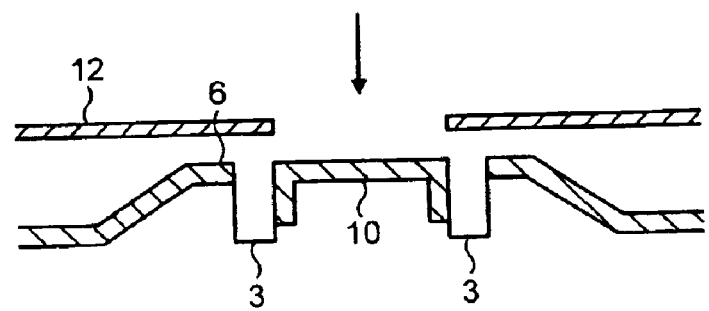
FIG. 2B is a fragmentary section, similar to FIG. 2 but with the central portion in the depressed position.

FIGS. 2A and 3A show the central portion of the hub in its resting position with a disc 12 held on the central portion, its central opening being placed over the push button. The outer upper edge portions 11 engage the upper surface of the disc at the opening therein and retain the disc 12 in place.

By depressing the push button in the direction of the arrow, the entire central portion 5 between the slots 3 is depressed. The outer upper edge portions 11 move the disc downwardly until its motion is arrested by the abutment surfaces 6 of the outer hub pieces 4. The disc engaging arms 9 then move together as the radiused upper edge portions 11 move through the opening in the disc, releasing it from engagement as shown in FIG. 3A. This may be achieved either with the case on a flat surface or with it held in one hand.

To replace the disc, the user simply places the disc with the opening over the push button and presses the disc down.

What is claimed is:

1. An apparatus for holding a disc that includes a lower surface and an upper surface with a central opening extending between the upper and lower surfaces; the apparatus comprising:

a base; and a hub connected to the base and extending upwardly from the base;

the hub including a central portion and outer portions that are diametrically opposed in relation to a center of the hub and separated from the central portion by respective slots;

the central portion being connected at diametrically opposed ends to the base and having resilient portions allowing the central portion to be pushed from a resting position to a depressed position;

the central portion including a pair of disc-engaging members for retaining a disc on the hub when the central portion is in its resting position and being movable towards one another when the central portion is moved from its resting position to its depressed position, thereby releasing the disc; and the diametrically opposed outer portions being non-movable with respect to the base for blocking movement of the disc toward the base when the central portion is moved from its resting position to its depressed position.

2. The apparatus of claim 1, wherein each outer portion includes an upwardly sloping outer wall and an abutment surface; the abutment surface upwardly offset from the base.

3. The apparatus of claim 2, wherein the central portion includes a pair of upwardly sloping wall portions and a substantially horizontal second wall portion connected to each of the upwardly sloping wall portions; the substantially horizontal wall portion being disposed at the same height as the abutment surfaces of the outer portions.

4. The apparatus of claim 3, wherein the second wall portion is substantially parallel to the base; the second wall portion having at least one continuous portion extending between the upward ends of the upwardly sloping first wall portions of the central portion.

5. The apparatus of claim 1, wherein the central portion includes at least one section that extends continuously from one side of the hub to the other side of the hub.

6. The apparatus of claim 5, wherein the central portion includes a gap between the disc-engaging members.

7. The apparatus of claim 1, wherein the central portion has substantially parallel edges that extend across the hub in parallel relationship equidistant from the center of the hub.

8. The apparatus of claim 1, wherein the disc-engaging members cooperate to form a central push button for the hub.

9. The apparatus of claim 3, wherein the upwardly sloping outer walls of the outer portions and the upwardly sloping wall portions together form, in the absence of the slots in the resting position of the central portion, a frustoconical surface.

10. The apparatus of claim 1, wherein the disc-engaging members include projections for extending over the top of the disc to retain the disc on the hub when the central portion is in its rest position.

11. The apparatus of claim 10, wherein the projections are diametrically opposed in relation to the center of the hub.

12. The apparatus of claim 3, wherein the disc-engaging members include a pair of arms extending upwardly from the substantially horizontal wall portion.

13. The apparatus of claim 1, wherein the disc-engaging members include a pair of arms extending substantially perpendicular to the base.

14. The apparatus of claim 13, wherein the arms include projections extending radially outwardly from the arms for extending over the top of the disc to retain the disc on the hub when the central portion is in its rest position.

15. The apparatus of claim 14, wherein the arms cooperate to form a central push button for the hub.

16. The apparatus of claim 13, wherein the arms are diametrically opposed in relation to the center of the hub.

17. An apparatus for holding a disc having a lower surface and an upper surface with a central opening extending between the upper and lower surfaces; the apparatus comprising:

a base defining an opening; and a hub connected to the base and covering a portion of the opening;

the hub including a central portion that is connected to the base on opposite sides of the opening defined by the base and a pair of outer pieces disposed on opposites sides of the central portion;

the outer pieces being adapted to support a disc and prevent the disc from moving downwardly with respect to the hub;

the central portion including a pair of upwardly extending disc-engaging arms;

the disc-engaging arms extending upwardly from the central portion;

the disc-engaging arms being spaced from one another;

the disc-engaging arms being adapted to be depressed from a resting position to a depressed position wherein the resting position holds a disc on the hub and the depressed position allows the disc to be removed from the hub;

each outer piece including an upwardly sloping outer wall and an abutment surface;

the abutment surface being substantially parallel to the base and disposed at the same height as the central portion;

the central portion including a pair of upwardly sloping wall portions and a substantially horizontal second wall portion connected to each of the upwardly sloping wall portions; and the horizontal wall portion being disposed at the same height as the abutment surfaces of the outer pieces.

18. The apparatus of claim 17, wherein the second wall portion is substantially parallel to the base; the second wall portion having at least one continuous portion extending between the upward ends of the upwardly sloping first wall portions of the central portion.

19. The apparatus of claim 18, wherein each of the arms extend substantially perpendicular to the horizontal wall portion of the central portion.

* * * * *